United States Patent
Weide et al.

(10) Patent No.: US 11,926,934 B2
(45) Date of Patent: Mar. 12, 2024

(54) METHOD FOR MONITORING THE SPINNING PROCESS ON A SPINNING DEVICE, SPINNING POSITION OF AN AIR-SPINNING MACHINE AND SPINNING DEVICE

(71) Applicant: Saurer Intelligent Technology AG, Arbon (CH)

(72) Inventors: Thomas Weide, Moenchengladbach (DE); Roland Werner, Krefeld (DE); Anja Koetzsch, Duesseldorf (DE)

(73) Assignee: Saurer Intelligent Technology AG, Arbon (CH)

( * ) Notice: Subject to any disclaimer, the term of this patent is extended or adjusted under 35 U.S.C. 154(b) by 95 days.

(21) Appl. No.: 17/554,380

(22) Filed: Dec. 17, 2021

(65) Prior Publication Data
US 2022/0195637 A1  Jun. 23, 2022

(30) Foreign Application Priority Data
Dec. 18, 2020  (EP) .................................. 20215384

(51) Int. Cl.
| | | |
|---|---|---|
| *D01H 13/32* | (2006.01) | |
| *D01H 4/02* | (2006.01) | |
| *D01H 13/26* | (2006.01) | |
| *G01D 5/24* | (2006.01) | |

(52) U.S. Cl.
CPC ............. *D01H 13/32* (2013.01); *D01H 4/02* (2013.01); *D01H 13/26* (2013.01); *G01D 5/24* (2013.01)

(58) Field of Classification Search
CPC .......... D01H 13/32; D01H 13/26; D01H 4/02; D01H 4/28; G01D 5/24
See application file for complete search history.

(56) References Cited

FOREIGN PATENT DOCUMENTS

| | | | | |
|---|---|---|---|---|
| CN | 101600825 A | 12/2009 | | |
| CN | 111691028 A | 9/2020 | | |
| DE | 102007009074 A1 | 8/2008 | | |
| EP | 1291457 A2 * | 3/2003 | ............. | D01H 1/115 |
| EP | 2573216 A2 * | 3/2013 | ............. | D01H 1/115 |
| EP | 3040458 A1 | 7/2016 | | |
| JP | H076274 U | 1/1995 | | |

OTHER PUBLICATIONS

Office Action from corresponding Chinese Patent Application No. 202111552095.4, dated Jan. 31, 2023, all enclosed pages cited (no English translation available).

* cited by examiner

*Primary Examiner* — Patrick J. Lynch
(74) *Attorney, Agent, or Firm* — Nelson Mullins Riley & Scarborough LLP

(57) ABSTRACT

A spinning device for manufacturing a thread from a supplied fibre band by a circulating air flow having a hollow spinning cone arranged in a spinning housing, the spinning housing having an envelope wall arranged coaxially and at a distance from the spinning cone and forming an envelope gap, and a nozzle device to which compressed air can be applied for producing an air flow circulating the spinning cone in the envelope gap. The spinning device having the spinning cone and the envelope wall for forming a capacitor unit to have electrodes arranged opposite one another with the envelope gap interposed and forming an electrode pair. A method for monitoring the spinning operation on the spinning device is also provided.

9 Claims, 3 Drawing Sheets

METHOD FOR MONITORING THE SPINNING PROCESS ON A SPINNING DEVICE, SPINNING POSITION OF AN AIR-SPINNING MACHINE AND SPINNING DEVICE

CROSS-REFERENCE TO RELATED APPLICATION

This application claims priority from EP 20215384.7, filed on Dec. 18, 2020, entitled "Verfahren zur Überwachung des Spinnvorgangs an einer Spinnvorrichtung, Spinnstelle einer Luftspinnmaschine sowie Spinnvorrichtung ", the entire contents of which are incorporated herein by reference.

FIELD OF THE INVENTION

The present invention relates to a spinning position of an air-spinning machine having a spinning device, and to a spinning device for manufacturing a thread from a supplied fibre band by means of a circulating air flow, having: a hollow spinning cone arranged in a spinning housing, the spinning housing having an envelope wall which is arranged coaxially with and at a distance from the spinning cone and forms an envelope gap, and a nozzle device which can be supplied with compressed air for generating an air flow circulating the spinning cone in the envelope gap. Furthermore, the present invention relates to a method for monitoring the spinning process on a spinning device and to the spinning device.

BACKGROUND OF THE INVENTION

Spinning devices, spinning positions having spinning devices as well as air-spinning machines composed of a plurality of spinning positions arranged side by side are known from the prior art in a variety of embodiments.

The spinning devices of the type mentioned at the beginning, as disclosed for example from DE 10 2007 009 074 A1, are typically fed with a fibre band via a drafting system, in which case the fibre band has previously been drafted by means of the drafting system in accordance with the thread fineness to be achieved. Inside the spinning device, the outer fibres of the fibre band are wound around the inner core fibres of the fibre band by means of a rotational flow generated by one or more air nozzles in an envelope gap between a spinning cone and an envelope wall of the spinning housing, and thus form the wrap fibres, which are decisive for the desired thread strength of the thread. This results in a thread with a true twist, which can finally be taken up through an outlet opening of the spinning device and, for example, wound on a tube.

As a result of process disturbances during the spinning process, e.g. caused by blockages or contamination of the nozzles or of the envelope gap, the problem of so-called twist-free points or points with a low number of wrap fibres and/or low twist in the thread can occur. These points form weak points in the thread, which can lead to thread breaks during further processing. Moreover, process disturbances over a relatively long period of time can result in the manufacture of packages which are completely provided with faulty threads and which are not suitable for further processing.

In order to reliably exclude such problem spots in the thread, it is necessary to interrupt the spinning process in the event of process disturbances which result in flaws on the threads. The prerequisite for this is a reliable detection of process disturbances, which can currently only be achieved indirectly by monitoring the thread exiting the spinning device, in which case, for example, differences in hairiness or diameter can be indications of process disturbances during the spinning process. However, such a detection of process disturbances has the disadvantage that they are only of limited reliability and, moreover, may already have led to a defective thread.

SUMMARY OF THE INVENTION

On this basis, the problem addressed by the present invention is one of providing a spinning position of an air-spinning machine with a spinning device as well as such a spinning device which can detect process disturbances reducing the thread quality as early as during the spinning process, i.e. in a causal manner. Furthermore, the problem addressed by the present invention is one of providing a method for monitoring the spinning process.

The present invention solves the problem by means of a spinning device, by means of a spinning position of an air-spinning machine and by means of a method. Advantageous further developments of the spinning device are presented herein.

It is characteristic of the spinning device according to the present invention that the spinning cone and the envelope wall for forming a capacitor unit have electrodes arranged opposite one another with the envelope gap interposed, forming a pair of electrodes.

According to the present invention, there is provision for the spinning cone and the envelope wall, or sections of the spinning cone and the envelope wall, each to have, in particular to form, an electrode of a capacitor unit. The capacitance of the capacitor unit or of the formed capacitor depends on the geometric dimensions of the electrodes as well as the distance of the electrodes from one another, and on the material arranged between the two electrodes. Compared with the capacitance of the capacitor unit in condition without thread, i.e. when the envelope gap between the electrodes filling the intermediate space is filled solely by the ambient air, wrap fibres arranged in the envelope gap cause a measurable change in the capacitance of the capacitor unit during a spinning operation. The change in capacitance of the capacitor unit can be a measurable increase or decrease depending on the design of the capacitor unit.

The mass of the wrap fibres arranged in the envelope gap between the electrodes can thus be continuously measured via the capacitor unit. If the mass of the wrap fibres in the area between the electrodes decreases, then the capacitance of the capacitor unit is preferably reduced. A drop in the capacitance of the capacitor unit below a lower limit value set for a correct thread thus signals that the mass of the required wrap fibres has not been achieved. If a correspondingly preferential reduction of the capacitance below the previously defined limit value is detected via an evaluating unit connected to the capacitor unit, then the corresponding spinning positions can be shut down immediately and suitable fault elimination measures can be carried out. An increase in capacitance above an upper limit value can also be detected by means of an evaluating unit connected to the capacitor unit. If the capacitance exceeds a defined upper limit, this is, for example, an indication of an excessive accumulation of fibres, which blocks the rotation of the wrap fibres, so that the spinning process can also be stopped as a result.

The spinning device according to the present invention thus makes it possible continuously to monitor the ongoing spinning process, in which case disturbances of the spinning process due to an insufficient number of wrap fibres or blockages in the envelope gap, which can lead to an inferior thread, can be immediately detected. The spinning device according to the present invention thus already prevents the formation of a defective thread and therefore makes it possible to dispense with subsequent inspections of the thread. All in all, the spinning device according to the present invention thus ensures in a special way the defect-free manufacture of a thread with the required properties.

The configuration of the electrodes on or with the envelope wall or he spinning cone can basically be undertaken in any way. For example, it is possible to form the electrodes in one piece with the envelope wall and/or the spinning cone, with sections of the envelope wall and/or the spinning cone acting as electrodes for this purpose, which must, however, be insulated from the other components in order to form a capacitor unit. According to a particularly advantageous embodiment of the present invention, however, there is provision for the electrodes to be attached to the envelope wall and/or to the spinning cone opposite one another with an interposed envelope gap.

According to this embodiment of the present invention, there is provision for separate electrodes to be electrically non-conductively connected to the envelope wall and/or the spinning cone. The electrodes can be arranged in any way, e.g. by an adhesive and/or screw connection, which makes it possible to exchange the electrodes easily if necessary. Furthermore, the use of separate electrodes for arrangement on the envelope wall and/or the spinning cone makes it possible in a particularly simple manner to insulate them from the envelope wall and/or the spinning cone, in which case a capacitor unit can be formed in a simple manner.

The design of the capacitor unit, i.e., among other things, the extension of the electrodes on the envelope wall and the spinning cone, is basically freely selectable. For example, it is possible to design the electrodes in such a way that they extend over the entire perimeter of the envelope wall and the spinning cone, so that a capacitor unit in the form of a ring capacitor is then formed, in which case the filling level of the envelope gap can be detected in a particularly reliable manner.

According to a particularly preferred embodiment of the present invention, there is provision for two or more pairs of electrodes to extend over an area delimited in the circumferential direction of the envelope wall and the spinning cone. According to this embodiment of the present invention, the electrodes only extend over a limited portion in the circumferential direction of the envelope gap. Thus, in the circumferential direction of the envelope gap, one or more portions of the envelope gap not enclosed by a capacitor unit are arranged adjacent to portions enclosed by a capacitor unit. In a preferred manner, the electrodes can extend or be arranged with their longitudinal axis in the circumferential direction, obliquely thereto or at right angles in the circumferential direction and/or distributed in a defined manner in the circumferential direction. The longitudinal axis of the electrode corresponds to that extension of the electrode which is greater in magnitude than the extension running at right angles thereto, which is understood to be the width of the electrode.

This preferred embodiment of the present invention enables, in addition or alternatively to a detection of the filling level of the envelope gap, i.e. a number of wrap fibres or the fibre density in the envelope gap, also a detection of the rotation speed of the wrap fibres around the spinning cone in the envelope gap since due to their rotation around the spinning cone, the wrap fibres rotate through areas monitored by means of a capacitor unit as well as areas not so monitored. The frequency of the changes in capacitance of one or more capacitor units that occur in the process allows conclusions to be drawn about the speed of rotation of the wrap fibres around the spinning cone.

In a particularly advantageous manner, there is provision for the electrodes to be positioned in a spiral arrangement on the envelope wall and the spinning cone. According to this embodiment of the present invention, the electrodes preferably extend in a manner corresponding to the longitudinal direction of the wrap fibres in the envelope gap during the spinning operation, taking into account tolerance-related deviations, which wrap spirally around the spinning cone during the spinning operation. The spiral or helical attachment of the electrodes to the envelope wall and the spinning cone corresponding to the spiral winding of the winding fibres during the spinning operation consequently corresponds to the orientation of the winding fibres, so that these are passed through the capacitor units with a longer portion during their rotation around the spinning cone, which then leads to higher capacitance changes, thereby simplifying signal processing.

According to a further embodiment of the present invention, there is further provision for surfaces of the electrodes of at least one capacitor unit facing the envelope gap to have an electrically non-conductive material. In principle, the a corresponding embodiment of the surfaces of these electrodes can be undertaken in any way, e.g. by applying a coating or other covering over the conductive surface. A corresponding embodiment prevents, in a particularly reliable way, disturbances in the detection of the capacitance changes, which result for example from a static charge by the moving fibres.

The present invention further solves the problem by a spinning position of an air-spinning machine for producing a thread from a supplied fibre band, having a spinning device for forming the thread from at least one fibre band supplied via a drafting system, and a winding device for winding the thread onto a take-up package, the spinning device being embodied in the manner described above in accordance with the present invention or further embodiments.

The spinning position according to the present invention is characterized in that, due to the use of a spinning device according to the present invention or a further embodied spinning device on the spinning machine, disturbances of the spinning process can be immediately detected and the spinning process can be interrupted so that fault elimination measures can then be initiated. By continuously monitoring the spinning process, the formation of a thread with properties deviating from those specified can be avoided in the first place, so that, in addition, further devices for inspecting the thread quality can be dispensed with on the air-spinning machine.

The present invention further solves the problem by a method for monitoring the spinning process on a spinning device according to the present invention or further embodiments, in which the following steps are performed for detecting at least one characteristic of the wrap fibres, in particular the number of wrap fibres or the fibre density in the envelope gap:

Build up an electric field in the area between the electrodes,

Detection of the capacitance of the capacitor unit in the condition without thread, Recording of the capacitance change in the spinning operation, Monitoring and comparison of the capacitance change with reference values known or previously determined for a proper thread.

According to the method disclosed in the present invention, there is provision for, after the build-up of an electric field at one or more capacitor units and the detection of their capacitance in the condition without thread, the change in capacitance resulting from the arrangement of the winding fibres in the region between the electrodes in the spinning operation to be detected and continuously compared with a known or determined, preferably already stored or transmitted, reference value or reference value range for the change in capacitance in the spinning operation, the reference value or reference value range having previously been determined for such a spinning operation in which a thread was produced in a correct manner.

Deviations in the capacitance changes from the reference value or the reference value range are indications of disturbances in the spinning process, in which case, for example, an increase in capacitance exceeding a limit value or a limit value range indicates an excessive arrangement of threads or thread remnants in the area between the electrodes. On the other hand, undershooting a lower limit value for the change in capacitance preferably indicates that too few wrap fibres are arranged in the envelope gap, which can lead to weak points in the thread produced during the spinning process.

In a preferred manner, the method for monitoring the spinning operation on a further embodiment of a spinning device as described above having the spiral arrangement of electrodes is performed by the steps of detecting capacitance changes and their frequency in the spinning operation, and monitoring the frequency of the capacitance changes and comparing them with a reference value and/or reference value range known or previously determined for a correct thread. Thus, the steps according to the present invention can be used not only to detect the characteristic of the fibre density, but additionally or alternatively to detect the characteristic of the rotation speed of the wrap fibres which determines the fibre density in the envelope gap.

Disturbances in the spinning process can thus be detected additionally or alternatively by detecting a deviation in the frequency of occurring capacitance changes from a corresponding reference value or reference value range, which indicate that the rotation speed is too low or too high.

Thus, according to a further preferred embodiment, in the event of a deviation in the frequency from a predetermined reference value or a reference value range, the spinning process can be adjusted or stopped in order to avoid weak points in the thread in the event of an out-of-tolerance value. For example, to adjust the spinning process, at least one characteristic constituting the spinning process, such as a pressure acting on a vortex chamber of the spinning device, a fibre band feed speed, and/or a thread take-up speed, can be adjusted. A pressure acting on the vortex chamber can be a positive pressure applied to generate a vortex air flow in the vortex chamber of the spinning device and/or a vacuum acting on the vortex chamber, which serves in particular to support the removal from the spinning device of fibres that are not bound into the thread during the spinning operation.

Alternatively or additionally, according to a further preferred embodiment, a draft of the fibre band can be adapted in a drafting system device upstream of the spinning device, by means of which the thread characteristic can also be suitably influenced in the course of the spinning process.

Particularly preferably, in the course of the adjustment of the spinning process and/or the drafting or subsequently thereto, the thread section produced during the detected tolerance deviation before adjustment of the spinning process and/or the drafting is cleaned out of the thread.

The proposed method thus makes it possible continuously to monitor the spinning process and, in the event of a malfunction which would lead to intolerable changes in the quality of the thread, immediately to adjust or interrupt the spinning process so that the manufacture of a defective thread or the manufacture of a take-up package having a defective thread can be avoided.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale.

An embodiment example of the present invention is explained below with reference to the drawings. In the drawings.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1:
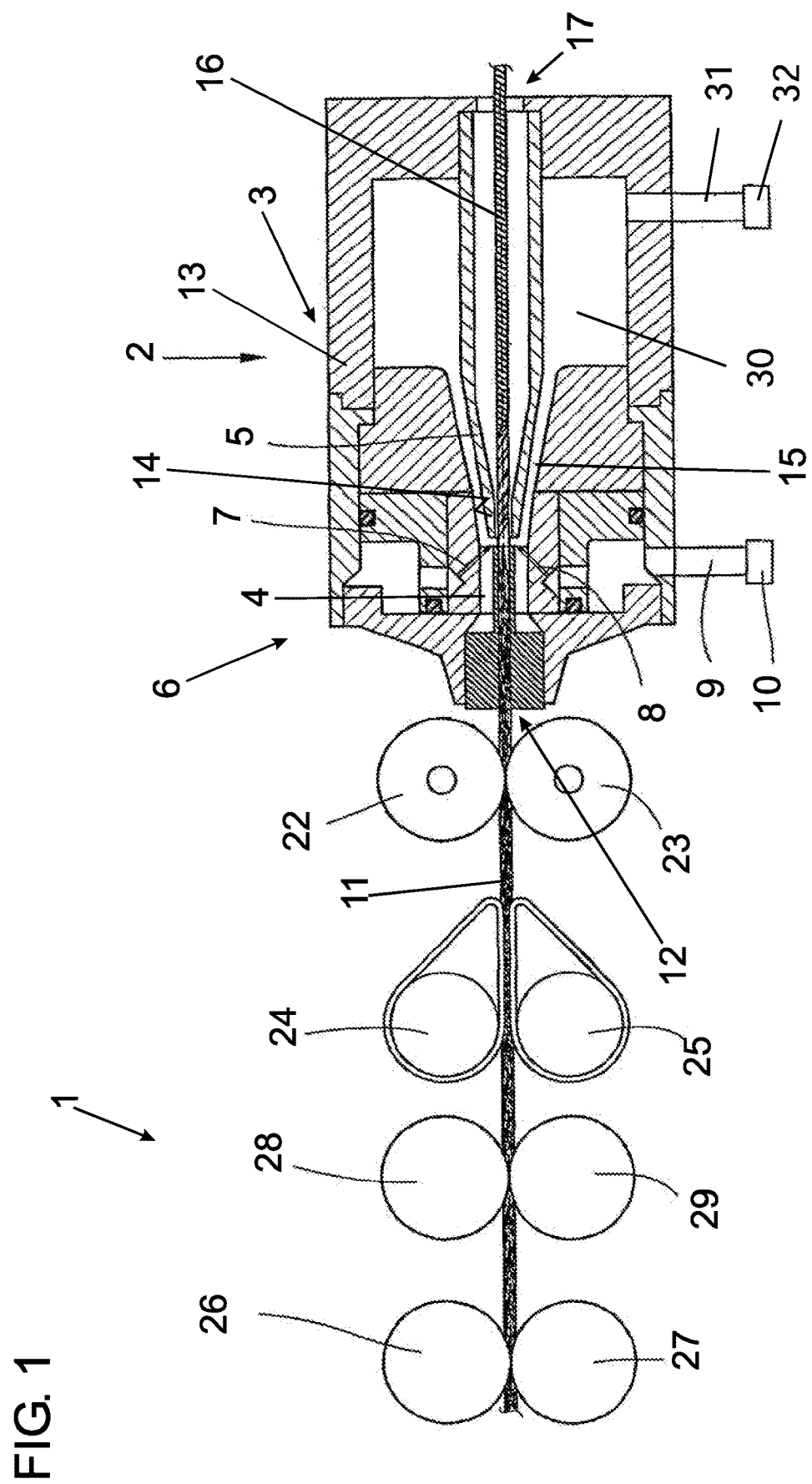
FIG. 1 shows a schematic representation of a spinning device known from the prior art, with an upstream drafting system.

For a general understanding of the mode of function of a spinning device 2, FIG. 1 shows the basic structure of a drafting system 1 with a downstream spinning device 2 which, in this embodiment example, is composed of multiple pieces. The fibre band 11 taken up from a fibre band source not shown here is pulled in by an input roller pair formed by an input top roller 26 and an input bottom roller 27. The fibre band 11 is then drafted between the second drafting system top roller 28 and the second drafting system bottom roller 29 as well as the third drafting system top roller 24 and third drafting system bottom roller 25 and the subsequent output roller pair consisting of output top roller 22 and output bottom roller 23. The drafted fibre band 11 then passes through an entry region 12 of a nozzle device 6 into the spinning device 2 and is transformed therein into a thread 16 by means of a thread-forming unit 3 as well as the nozzle device 6 of the spinning device 2. The component of the spinning device 2 having the entry region 12 forms, together with the nozzle device 6, a first part of the spinning device 2. The thread-forming unit 3 forms the second part of the spinning device 2, with the first and second parts being designed and mounted in such a way as to be movable relative to one another for opening the spinning device 2 for cleaning and maintenance purposes.

The nozzle device 6 has nozzles 7, 8 for this purpose, which are connected to a compressed air source 10 via lines 9. The air flowing out of the nozzles 7, 8 produces a rotational flow within a vortex chamber 4, which rotational flow is applied to the fed, drafted fibre band 11. The thread-forming unit 3 has a thread-forming element in the form of a spinning cone 5, which, in conjunction with the nozzle device 6, forms the thread 16, which is taken up from the spinning device 2 via the hollow spinning cone 5 through an outlet opening 17. An expansion space 30 following the vortex chamber 4 in the thread take-up direction is coupled via a further line 31 to a vacuum air source 32 for removing fibre residues.

In the spinning device 2, the outer wrap fibres 19 are wound around the inner core fibres 18 of the fibre band 11 due to the vortex air flow generated within the spinning device 2 or vortex chamber 4 and thus guarantee the desired strength of the thread 16.

Figure 2:
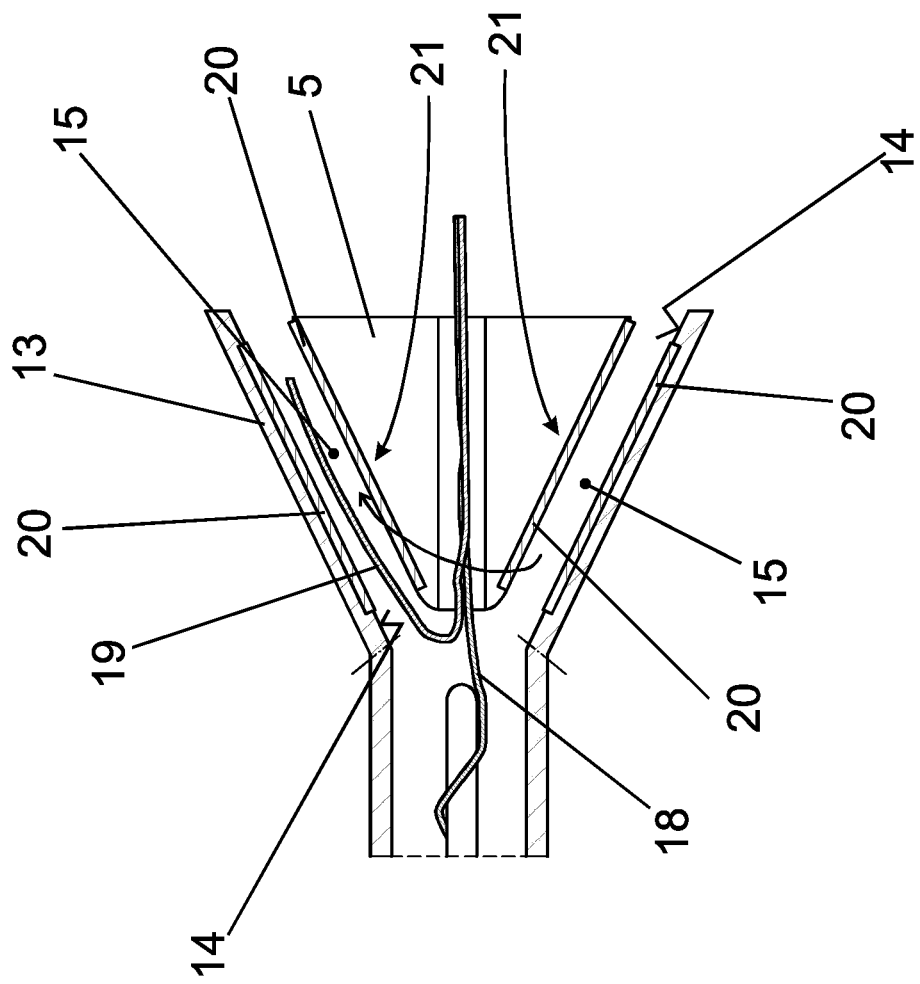
FIG. 2 shows a sectional view of a schematic representation of a spinning device according to a preferred embodiment example in the region of an envelope gap between an envelope wall and a spinning cone.

FIG. 2 shows an embodiment of a spinning device 2 according to a preferred embodiment example in the region of the spinning cone 5 and the envelope wall 14 of a spinning housing 13 coaxially encompassing the spinning cone 5. The core fibre 18 of the drafted fibre band 11 enters a central opening of the hollow spinning cone 5, whereas the outer wrap fibres 19 of the fibre band 11 enter the envelope gap 15 due to the air flow circulating the spinning cone 5 in the region of the envelope gap 15 between the envelope wall 14 and the spinning cone 5. Due to the circulating air flow in the envelope gap 15, the wrap fibres 19 rotate around the spinning cone 5 and are wound spirally around the core fibre 18 when the thread 16 is unwound.

To detect the fibre density in the envelope gap 15, electrodes 20 are arranged opposite one another on the spinning cone 5 and the envelope wall 14 with the envelope gap 15 in between, and these items together form a capacitor unit 21. The electrodes 20 are insulated from the spinning cone 5 and the spinning housing 13, respectively, so that after an electric field is built up between the electrodes 20, the capacitor unit 21 formed by the electrodes 20 undergoes a change in capacitance, for example an increase in capacitance compared to a fibre-free envelope gap 15, when the winding fibres 19 pass through it.

By means of monitoring and comparison of the change in capacitance with a reference value known or determined for a correct thread, which reference value can be stored in a retrievable manner or can be transmitted, conclusions can thus be drawn about the filling level of the envelope gap 15, in particular about a number of wrap fibres 19 or the fibre density, in which case an excessive increase in capacitance in particular can indicate contamination of the envelope gap 15 and a reduction in capacitance compared with a reference value can indicate an insufficient arrangement of wrap fibres 19 in the envelope gap 15.

In the embodiment example shown in FIG. 2, the electrodes 20 extend opposite one another over the entire circumferential surface of the spinning cone 5 or the envelope wall 14, thus forming a capacitor unit 21 in the manner of a ring capacitor.

Figure 3:
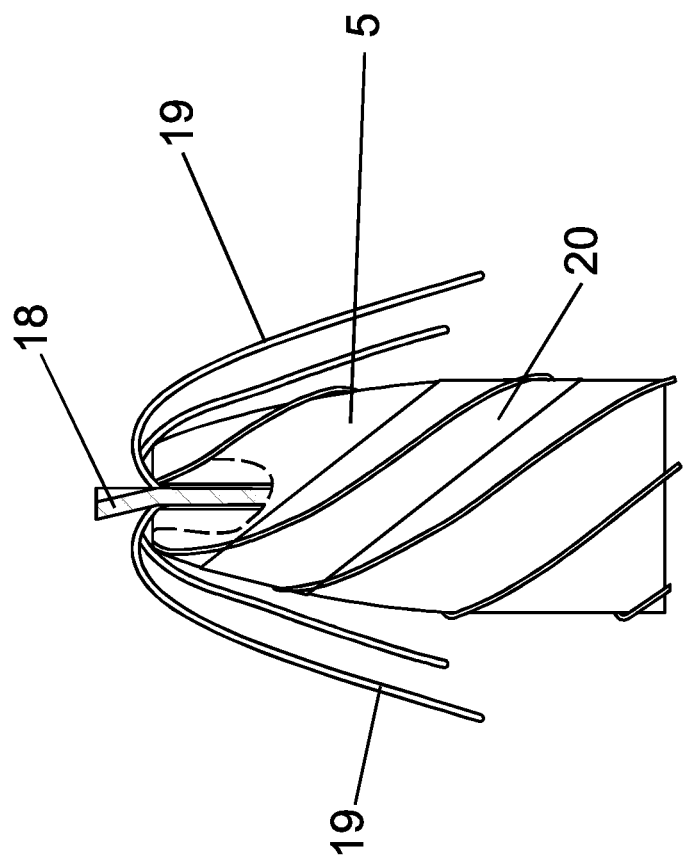
FIG. 3 shows a schematic view of the spinning cone of the spinning device in FIG. 2 in the spinning operation.

In the embodiment example shown in FIG. 3, the electrodes 20 extend only over a partial area in a spiral over the spinning cone 5 as well as in a corresponding manner on the opposite envelope wall 14 (not shown here) of the spinning housing 13. In this regard, the spiral orientation of the electrode 20 corresponds to the orientation of the wrap fibres in the spinning operation due to the generated air flow within the envelope gap 15. This orientation of the electrode 20 thus enables effective detection of the wrap fibres 19 in the region between the electrodes 20, at the same time as allowing conclusions to be drawn about the rotational speed of the wrap fibres 19 around the spinning cone 5 by means of the change in capacitance when passing through the capacitor unit 21, as well as permitting measures to be taken which can be derived therefrom, such as for example an adjustment of the spinning process, an adjustment of a draft in the drafting system 1 and/or a stopping of the spinning process as well as, if necessary, a cleaning out of the thread section produced during the detected tolerance deviation before adjustment of the spinning process or the draft is possible.

LIST OF REFERENCE SIGNS

1 Drafting system
2 Spinning device
3 Thread-forming unit
4 Vortex chamber
5 Spinning cone
6 Nozzle device
7 Nozzle
8 Nozzle
9 Line
10 Compressed air source
11 Fibre band
12 Entry region
13 Spinning housing
14 Envelope wall
15 Envelope gap
16 Thread
17 Outlet opening
18 Core fibre
19 Wrap fibres
20 Electrode
21 Capacitor unit
22 Output top roller
23 Output bottom roller
24 Third drafting system top roller
25 Third drafting system bottom roller
26 Input top roller
27 Input bottom roller
28 Second drafting system top roller
29 Second drafting system bottom roller
30 Expansion space
31 Further line
32 Vacuum air source It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any

What is claimed is:

1. A spinning device for manufacturing a thread from a supplied fibre band by a circulating air flow, comprising:
   a hollow spinning cone arranged in a spinning housing, the spinning housing having an envelope wall which is arranged coaxially with and at a distance from the spinning cone and forms an envelope gap, and
   a nozzle device which can be supplied with compressed air for generating an air flow circulating the spinning cone in the envelope gap,
   characterised in that
   the spinning cone and the envelope wall for forming a capacitor unit have electrodes arranged opposite one another with the envelope gap interposed, forming a pair of electrodes.

2. The spinning device according to claim 1, characterised in that, the electrodes are attached opposite one another on the envelope wall and/or the spinning cone and are insulated from the spinning cone and the spinning housing.

3. The spinning device according to claim 1, characterised in that two or more pairs of electrodes extend over an area delimited in a circumferential direction of the envelope wall and the spinning cone.

4. The spinning device according to claim 1, characterised in that the electrodes are arranged in a spiral on the envelope wall and the spinning cone and are insulated from the spinning cone and the spinning housing.

5. The spinning device according to claim 1, characterised in that surfaces of the electrodes of at least one capacitor unit facing the envelope gap have an electrically non-conductive material.

6. A spinning position of an air-spinning machine for manufacturing thread from the supplied fibre band, comprising:
   the spinning device according to claim 1 for forming thread from the supplied fibre band fed via a drafting system, and
   a winding device for taking up the thread on a take-up package.

7. A method for monitoring a spinning operation on the spinning device-according to claim 1, in which the following steps are performed for detecting at least one characteristic of wrap fibres in the envelope gap:
   build up an electric field in an area between the electrodes,
   detection of the capacitance of the capacitor unit in a condition without thread,
   recording of a capacitance change in the spinning operation,
   monitoring and comparison of the capacitance change with a reference value or reference value range known or previously determined for a proper thread.

8. The method according to claim 7, characterised by the spinning device, wherein the electrodes are arranged in a spiral on the envelope wall and the spinning cone and are insulated from the spinning cone and the spinning housing, detecting capacitance changes and their frequency in the spinning operation, and monitoring the frequency of the capacitance changes and comparing the capacitance changes with the reference value and/or reference value range known or previously determined for the proper thread in order to determine a rotation speed of the wrap fibres in the envelope gap for fibre density.

9. The method according to claim 7, characterised in that at least one characteristic of the spinning operation is a pressure acting on a vortex chamber of the spinning device, a fibre band feed speed or a thread take-up speed is adjusted in response to a deviation from the reference value or the reference value range, or the spinning operation is stopped.

* * * * *